United States Patent [19]
Ayyagari

[11] 4,077,206
[45] Mar. 7, 1978

[54] GAS TURBINE MIXER APPARATUS FOR SUPPRESSING ENGINE CORE NOISE AND ENGINE FAN NOISE

[75] Inventor: Radhakrishna Ayyagari, Seattle, Wash.

[73] Assignee: The Boeing Company, Seattle, Wash.

[21] Appl. No.: 677,791

[22] Filed: Apr. 16, 1976

[51] Int. Cl.$^2$ .............................................. F02K 11/02
[52] U.S. Cl. ....................................... 60/262; 60/264; 239/127.3; 239/265.17; 181/220
[58] Field of Search ............. 60/262, 264; 181/33 HC; 239/127.3, 265.17

[56] References Cited

U.S. PATENT DOCUMENTS

| | | | |
|---|---|---|---|
| 2,426,833 | 9/1947 | Lloyd | 181/33 HC |
| 3,436,020 | 4/1969 | Duthion et al. | 181/33 HC |
| 3,467,312 | 9/1969 | Mehr | 181/33 HC |
| 3,481,427 | 12/1969 | Dobbs et al. | 181/33 HB |
| 3,583,640 | 6/1971 | MacDonald | 181/33 HC |
| 3,730,292 | 5/1973 | MacDonald | 181/33 HC |
| 3,861,140 | 1/1975 | Krabacher | 60/262 |

FOREIGN PATENT DOCUMENTS

| | | | |
|---|---|---|---|
| 997,262 | 1/1952 | France | 181/33 HC |

*Primary Examiner*—Robert E. Garrett
*Attorney, Agent, or Firm*—Christensen, O'Connor, Johnson & Kindness

[57] ABSTRACT

A low noise mixer apparatus for mixing the turbine exhaust effluent of a turbofan gas turbine engine with a portion of the air flowing from the engine fan stage prior to discharge from the engine is disclosed. The mixer is of the daisy variety, having a tubular mixer section that includes a number of axially extending, circumferentially spaced lobes with the tubular mixer section coaxially mounted around the engine plug. An outer duct coaxially surrounds the plug and mixer section. The turbine exhaust flows through an annular passage formed between the exterior surface of the plug and the interior wall of the mixer section and the fan air flows through an annular passage formed between the inner surface of the outer duct and the outer surface of the mixer section. As in previous daisy type mixers, the turbine exhaust and fan air are mixed as the two gaseous streams flow past the exit plane of the mixer section to thereby increase the thrust produced by the engine and also decrease the component of noise known as jet noise. To further reduce the overall engine noise level, the mixer of this invention includes a first acoustically absorbent material mounted along the crests of the axially extending mixer lobes and a second acoustically absorbent material axially mounted in the interlobal regions. The first acoustic material is selected to dissipate low frequency noise energy associated with the turbine exhaust gases (commonly called core noise) and the cross-sectional geometry of the mixer lobes are established to match the impedance of the first acoustically absorbent material to the characteristic impedance of the core noise traveling through the mixer. The second acoustically absorbent material is selected to dissipate the higher frequency noise associated with the flowing fan air. Advantageously, shaping the lobes for the impedance matching of the core noise to the impedance of the first acoustic material also tends to match the impedance of the second acoustic material to the impedance of the fan noise.

12 Claims, 3 Drawing Figures

GAS TURBINE MIXER APPARATUS FOR SUPPRESSING ENGINE CORE NOISE AND ENGINE FAN NOISE

BACKGROUND OF THE INVENTION

Many types of modern gas turbine engines are of the mixed flow variety wherein a primary fluid stream is mixed with a secondary fluid stream prior to discharge of the exhaust fluid into the atmosphere as a common thrust-producing mixed flow fluid stream. Generally, the primary fluid stream is the high velocity, high temperature exhaust effluent flowing from the turbine stage and the secondary fluid stream is air or gas at a lower temperature and velocity, e.g. air from the engine fan stage. As is known in the art, such mixed flow has two beneficial effects. First, engine thrust is improved since the mixed gases have a higher mass-velocity product that that of the turbine exhaust gases alone. Secondly, the noise level is reduced since the exhausted mixed gases have a lower velocity than the velocity of the turbine exhaust gases.

Decreasing the velocity of the gaseous thrust-producing fluid stream reduces the overall engine noise by decreasing that component of engine noise commonly called jet noise. Jet noise is not generated within the gas turbine engine, but is caused by turbulence resulting from the large velocity gradients that exist at the boundary between the exhausted fluid stream and the atmosphere. Since the intensity of the jet noise component is exponentially related to the velocity of the exhausted fluid, decreasing the fluid velocity prior to discharge into the atmosphere substantially reduces the intensity of the jet noise.

One prior art arrangement for mixing the two fluid streams includes an outer duct of substantially circular cross-section coaxially mounted about a generally tubular mixer section. In many instances, the mixer section coaxially surrounds an engine plug which extends rearwardly along the axial center line of the gas turbine engine. In such an arrangement the turbine exhaust gases flow through the annular duct formed between the engine plug and the inner surface of the mixer section and the cooler, lower velocity gases, e.g. fan air, flow through the annular duct formed between the inner surface of the outer duct and the outer surface of the mixer section. The high temperature, high velocity turbine exhaust mixes with the low temperature, low velocity gases as the two fluid streams flow past the mixer section exit plane.

One type of the above-described mixing apparatus, commonly called a daisy mixer, includes a mixer section having a plurality of axially extending circumferentially spaced lobes or corrugations of increasing radial dimension relative to the mixer length. Effectively, these lobes increase the peripheral length of the mixing boundary formed at the mixer section exit plane to thereby provide more efficient mixing, and hence, lower jet noise.

Such prior art daisy type mixers are employed within jet engine exhaust nozzles wherein an exhaust nozzle is mounted on the aft portion of the gas turbine engine for mixing the engine exhaust with ambient air or air supplied by various engine components such as the compressor stage or fan stage of a turbofan engine. Additionally, such daisy type mixers are often utilized within a bypass type turbofan gas turbine engine in which a portion of the air supplied by a forward mounted fan stage is ducted around the compressor and combustor stages and mixed with the turbofan exhaust gases at a position aft of the engine turbine stages.

Although prior art daisy mixers are effective in reducing the overall jet noise by reducing the level of the jet noise component, the several other noise components produced by the engine generally pass through the mixer and out the engine tail pipe or exhaust orifice substantially unaltered. One such noise component, due to acoustic energy contained within the high temperature, high velocity turbine exhaust gases is commonly called core noise. Although the exact source mechanisms of core noise are unknown, core noise includes contributions from the combustion of the jet fuel within the engine combustor stage and contributions due to the interaction of the unstable combustor gases with the downstream blades. Further, it is known that core noise is distributed over a relatively low frequency portion of the frequency spectrum, commonly peaking at between 200 and 600 Hz regardless of engine size.

A second noise component that is not substantially altered by prior art daisy mixers is commonly called aft fan noise. Aft fan noise results from unsteady or turbulent forces on the fan blades due to unsteady flow conditions within the fan stage and also results from shock waves produced by the leading edge of the fan rotors. The acoustic energy which constitutes the fan noise occupies a portion of the frequency spectrum generally between 2 and 6 KHz.

In prior art gas turbine engines, attempts to reduce or suppress fan noise have generally included design of the fan structure to minimize the generation of fan noise and also attempts to acoustically treat the fan ducts to attenuate the noise energy as it propagates through the fan duct. With respect to core noise, the prior art attempts have generally been limited to muffler-like structure that is mounted in an extended exhaust duct to attenuate the core noise as it passes from the engine. None of the prior art attempts have been totally successful and much of the prior art presents serious drawbacks in that improved noise performance is achieved only by accepting substantial added weight and engine performance penalties.

Accordingly, it is an object of this invention to provide means for suppressing the noise generated by a gas turbine engine.

It is another object of this invention to provide a mixer assembly for use within a mixed flow gas turbine engine which suppresses internally generated noise components as well as the externally generated jet noise component.

It is yet another object of this invention to provide a daisy type gas turbine mixer assembly for use in mixing fan air with turbine exhaust gases wherein the mixer is arranged to attenuate the core noise associated with the turbine exhaust gases and to also attenuate the aft fan noise associated with the air flowing from the fan stage.

It is still another object of this invention to provide a mixer assembly for use in a mixed flow gas turbine engine with the mixer assembly including integral means for the suppression of core noise and fan noise to thereby improve noise performance without substantial increase in engine weight or appreciable loss of engine performance.

SUMMARY OF THE INVENTION

These and other objects are achieved in accordance with this invention by a mixer stage of the daisy variety that includes localized regions of sound absorbent materials and specific contouring of the mixer lobes to provide acoustic impedance matching between the sound absorbing materials and the noise carrying fluid streams.

Like prior art daisy type mixers, each embodiment of this invention includes a mixer section having a plurality of axially extending circumferentially spaced lobes of increasing radial dimension relative to the mixer axial length. The mixer section is coaxially mounted around an engine tail plug to form a first annular flow duct for the turbine exhaust gases and the mixer section is coaxially surrounded by a fan duct to thereby form a second annular flow duct for the fan air.

Unlike prior art multilobe mixers, the outermost portion or crest of each lobe of the mixer section of this invention comprises a sound absorbent material that absorbs sound energy over a frequency range including the frequency spectrum of the core noise. To increase the suppression of core noise, the transfer of acoustic energy between the turbine exhaust stream and the sound absorbent material is maximized by acoustic impedance matching. Specifically, the cross-sectional geometry of each mixer lobe is configured as a convex exponential horn with the horn mouth region facing inwardly toward the engine plug and the horn throat region extending outwardly toward the interior surface of the fan duct. In the preferred embodiments, the sound absorbent material is mounted across the throat region of each horn to thereby form the crest of each mixer lobe.

Since the turbine exhaust gases passing through the annular flow duct formed between the engine plug and the inner surface of the mixer section have a velocity vector including an outwardly directed radial component, the turbine exhaust gas and the acoustic energy contained therein (core noise) impinges on the sound absorbing material. Further, since the convex horn shape causes the lobes to act as acoustic impedance matching sections, reflections of acoustic energy from the interior surface of the mixer and reflections from the surface of the sound absorbing material are minimized to thereby maximize acoustic energy transfer between the turbine exhaust stream and the sound absorbing material. In addition, the outwardly directed radial component of velocity of the acoustic energy is increased, in accordance with this invention, by several means. First, in some embodiments, the geometry of the engine plug is established to reflect the acoustic energy impinging on the engine plug outwardly toward the mouth of the convex exponential horns. Secondly, in some embodiments, the contour of the turbine exhaust duct establishes velocity gradients that refract acoustic energy outwardly toward the horn sections and the sound absorbing material. Additionally, the flow of the cooler fan air through the surrounding annular fan duct tends to create temperature gradients within the turbine exhaust duct which refract the acoustic energy outwardly toward the mouth of the impedance matching horns. Accordingly, in the practice of this invention, core noise is suppressed by sound absorbing material mounted along or forming the crest of the mixer lobes with the transfer of acoustic energy between the turbine exhaust gases and the sound absorbing material enhanced by the specific geometry of the mixing apparatus.

Further, in accordance with this invention, fan noise is suppressed by sound absorbing lining material axially mounted on the exterior surface of the mixer section within the interlobal or valley regions that are formed between adjacent mixer lobes. This sound absorbing lining exhibits viscous damping over a frequency range that includes the frequency spectrum of the fan noise. Advantageously, the previously described cross-sectional shaping of the mixer lobes such that the interior lobe surfaces form convex exponential horns simultaneously shapes the exterior surface between adjacent lobes as concave exponential acoustic horns. These concave exponential horns tend to match the characteristic impedance of the sound absorbent lining material to the characteristic impedance of the fan air stream flowing through the annular duct formed between the interior surface of the fan duct and the exterior surface of the mixer section. Thus, as fan air flows along the exterior surface of the mixer section, at least a portion of the acoustic energy constituting the fan noise impinges on and is absorbed by the acoustic lining material to thereby decrease the engine noise level.

The preferred embodiment of this invention includes the above-described structural provisions for suppression of both core noise and fan noise. In the preferred embodiment, the cross-sectional geometry of the mixer lobes is established such that the inner surface contour of each lobe is definable in terms of a hyperbolic cosine function. Such contouring permits the described impedance matching to be achieved with impedence matching horns of relatively short length to thus minimize the diameter of the mixing section.

DETAILED DESCRIPTION

Figure 1:
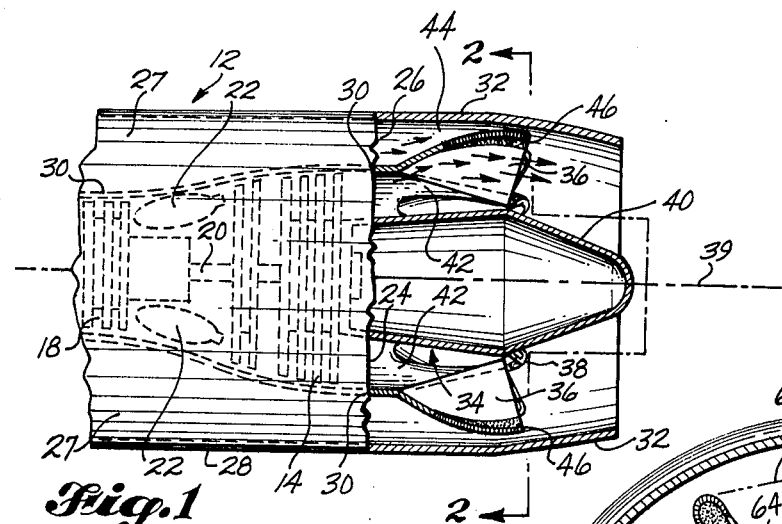
FIG. 1 is a longitudinal view, in partial cross section, of a portion of a gas turbine engine equipped with a mixer stage in accordance with this invention.

FIG. 1 depicts a portion of a conventional turbofan gas turbine engine equipped with a mixer stage in accordance with this invention. The turbofan engine of FIG. 1 includes a mixer stage 10 mounted aft of and in alignment with a forward engine assembly 12. The depicted portion of the engine assembly 12 includes high pressure turbine stage 14, low pressure turbine stage 16, and axial compressor 18 each of which are mounted to and rotate with a central shaft 20. Axial compressor 18 supplies compressed air to combustor 22 which is mounted between the compressor 18 and the low pressure turbine 16. Fuel is injected into combustor 22 and ignited. Air, flowing from compressor 18 flows through openings in the combustor walls and mixes with the combusted fuel to form combustion products. The hot combustion products flow serially through the low pressure turbine 16 and the high pressure turbine 14 to rotate the turbine assemblies and shaft 20. The high temperature, high velocity gases exhausting from the high pressure turbine 14 are introduced into an annular entrance opening 24 of mixer stage 10.

In addition, airflow from a forward mounted fan assembly (not shown in FIG. 1) is ducted to a second annular entrance opening 26 of mixer stage 10 which coaxially surrounds the turbine exhaust opening 24. Ducting of the fan air from the forward mounted fan assembly to the annular opening 24 can be achieved in a variety of ways. In the arrangement of FIG. 1, an annular fan duct 27 is formed by a circular duct housing 28 which coaxially surrounds an inner housing 30 which, in turn, coaxially surrounds the engine core (axial compressor 18, combustor 22, and turbine stages 14 and 16).

Figure 2:
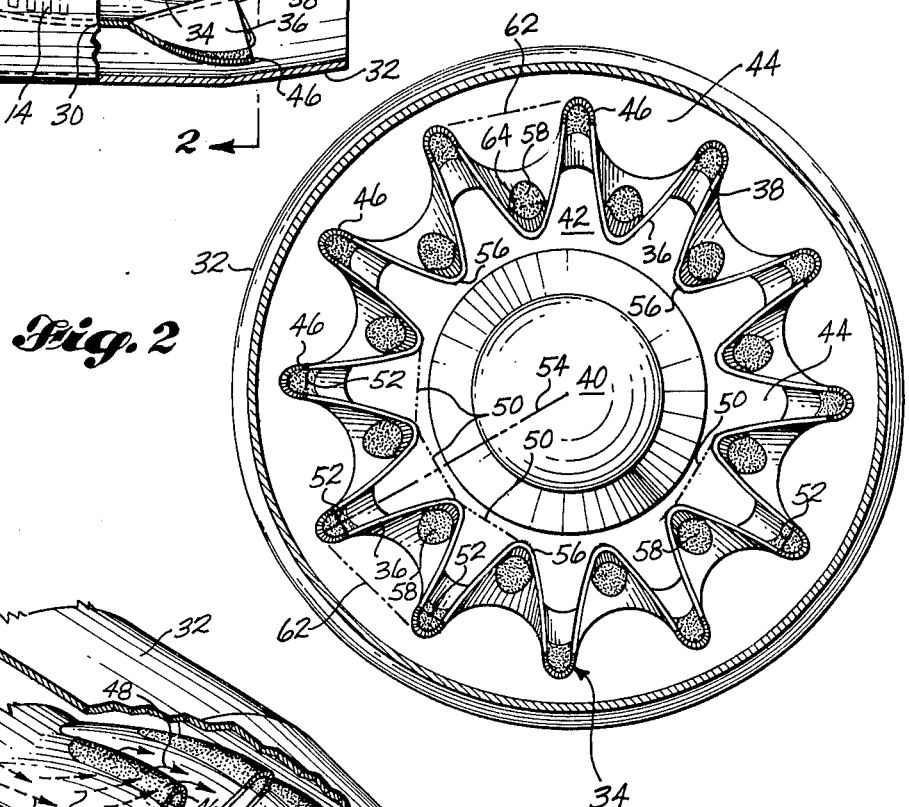
FIG. 2 is a rear view of the embodiment depicted in FIG. 1 taken along the line A—A of FIG. 1.

The mixer stage 10 includes an outer duct housing 32 which can be a separate tubular structure mounted immediately adjacent the rearward end of outer duct housing 30 to thereby form a rearwardly extending continuation of duct housing 30. Alternatively duct housings 30 and 32 can be combined as a single continuous duct structure. In any case, mixer stage 10 includes a generally tubular mixer section 34 which has a circular forward end fixed securely to the inner housing 30 of gas turbine engine 12. Viewing mixer section 34 parallel to the direction of turbine exhaust flow, the wall of the mixer section 34 remains generally circular in cross section for a short distance and then is corrugated to form a plurality of corrugations or lobes 36 that extend axially along the mixer section and are evenly spaced circumferentially thereof. More explicitly, the corrugations in the wall of the mixer section 34 are shallow at the forward end thereof and gradually increase in depth in the downstream or aft direction. Thus, the lobes 36 increase in radial dimension in the downstream direction with the aft edge 38 of the mixer section 34 having a "daisy petal" shape as shown in FIG. 2.

Referring to FIG. 1, the mixer section 34 coaxially surrounds an engine tail plug 40 that is of a generally conical shape and extends rearwardly from the engine 12. With this mounting arrangement a turbine exhaust duct 42 extending from the annular opening 24 to the mixer section aft edge 38 is formed between the exterior wall surface of tail plug 40 and the interior wall surface of mixer section 34. Further, a fan duct 44, extending from the annular opening 26 to the mixer section aft edge 38, is formed between the exterior wall surface of mixer section 34 and the interior wall surface of the duct housing 32. Generally, the mixer section 34 is dimensioned such that the mixer section aft edge 38 is positioned forward of the aft ends of the duct 32 and the plug 40.

In operation, the high temperature, high velocity turbine exhaust gases flow through the turbine exhaust duct 42 and are diffused due to the diverging shape of the mixer section 34. As the turbine exhaust gases flow past the mixer section aft edge 38, the turbine exhaust is mixed with the cooler, lower velocity air flowing through the fan duct 44. This mixing produces an exhaust stream having a lower temperature and velocity than the turbine exhaust gases with the mixed stream being subsequently discharged from the opening defined by the aft end of duct housing 32 to produce thrust.

The mixing of the fan air with the turbine exhaust gases increases the engine thrust over that which would be produced by exhausting the turbine exhaust gases alone since the mixed gases have a higher mass-velocity product than that which would be produced by the turbine exhaust stream alone. Further, since one of the sources of noise associated with the operation of the gas turbine engine results from the discharge of a high velocity, high temperature exhaust stream into the atmosphere, the engine noise level is reduced. More specifically, one component of gas turbine noise commonly called jet noise results from the pressure disturbances created at the flow boundaries between a high velocity jet stream and the surrounding atmosphere. It has been determined that the jet noise produced by a high velocity single stream discharge is proportional to the jet stream velocity exponentially raised to a relatively high power (typically 8). Accordingly, reducing the velocity of the thrust producing fluid stream prior to discharge into the atmosphere greatly reduces the overall engine noise level.

Turning now to the aspects of this invention that provide suppression of core noise and fan noise, the structure and operation of an embodiment for suppressing core noise will first be discussed with reference to the drawing. Referring to FIGS. 1 and 2, a layer or sheet of sound absorbent material 46 forms the outermost portion or crest of each mixer lobe 36. The sound absorbing material 46 is contoured to have a generally semicircular cross-sectional shape and is mounted between portions of the mixer lobe walls such that sound absorbent material 46 and the mixer wall 48 together form a mixer section 34 that somewhat resembles a prior art daisy mixer. In the axial direction, sound absorbent material 46 generally extends forward from the mixer aft edge 38 to a point at or near the forward termination of each mixer lobe 36.

Sound absorbent material 46 can be any conventional gas permeable sound absorbent material that can be formed and mounted in the above-described manner which also exhibits suitable acoustic attenuation over a frequency range that includes the frequencies of the core noise. As is known to those skilled in the art, such materials are characterized by a number of performance parameters such as acoustic impedance or resistance and nonlinearity factor. The importance of these parameters in the practice of this invention, and thus the criteria for selecting the particular material to be employed in any given embodiment of the invention will become apparent in the hereinafter contained discussion of the operation of the invention. Examples of such acoustic materials include Brunsacoustic, manufactured by the Brunswick Corporation and felt metal, manufactured by Aircraft Porous Media, Incorporated.

It can be realized that as turbine exhaust gases flow through turbine exhaust duct 42, the acoustic waves that constitute the core noise propagate both in the rearward direction and in the outward radial direction. That is, the velocity vector of each particle within the acoustic noise field generally includes a vector component directed axially toward the mixer section aft edge 38 and a vector component directed in the outward radial direction relative to the axial centerline 39 of the mixer section 34. Thus, as shown by the arrows 48 of FIG. 3, a portion of the turbine exhaust gases and a portion of the core noise energy impinges on the inner surface of each sound absorbent section formed by sound absorbent material 46. Since the sound absorbent material 46 is gas permeable, a portion of the impinging exhaust gases and impinging noise energy propagates radially outwardly through the sound absorbing material 46 into fan duct 44. This flow of turbine exhaust gas and noise energy through the sound absorbing material dissipates at least a portion of the acoustic energy due to the viscous damping mechanism exhibited by such sound absorbent materials and results in a small pressure differential between the interior and exterior surfaces of the sound absorbent material 46. It has been found in the practice of this invention that the resulting small pressure differential does not impose substantial performance penalties. In fact, in some embodiments engine thrust is improved during operation of the engine under cruise conditions. For example, in one embodiment of the invention, for use with a jet propelled aircraft wherein the mixer section includes a twelve lobe mixer section such as the depicted mixer section 34, a thrust penalty of less than 1% was encountered under take-off conditions and a thrust improvement of approximately 0.5% was encountered under cruise conditions (relative to the performance of a conventionally configured daisy type twelve lobe mixer section).

Preferably, in the practice of this invention, the suppression of core noise by the sound absorbing material 46 is enhanced by acoustically impedance matching the impedance of the sound absorbing material 46 to the characteristic impedance of the turbine exhaust stream. One reason such impedance matching is advantageous is because, as previously mentioned, the core noise comprises acoustic energy of relatively low frequencies. Thus the wave length of the various frequency components within the core noise are typically greater than, or comparable to, the dimensions of the turbine exhaust duct 42 and the core noise energy does not readily propagate outwardly toward the sound absorbent material 46. Secondly, with respect to that portion of the core noise energy that does propagate outwardly toward the sound absorbent material 46, a portion of the gas particles that impinge on the wall surface of the lobes 36 and a portion of the gas particles that impinge on the surface of the sound absorbent material 46 are reflected therefrom and hence the energy of these particles is not dissipated within the sound absorbent material.

In accordance with this invention, the amount of core noise energy transferred to sound absorbent material 46, and thus the suppression of core noise, is increased by structuring the cross-sectional geometry of each lobe 36 to define an acoustic impedance matching section. Referring now to FIG. 2, it can be seen that the cross-sectional geometry of each mixer lobe 36 of the depicted 12-lobe mixer embodiment is of a generally convex horn shape. Each horn shaped lobe 36 includes a mouth region 50 opening inwardly toward the engine plug 40 and a throat region 52 located in spaced relationship with the interior surface of the outer duct housing 32. As can be noted in FIG. 2, the sound absorbent material 46 is positioned across the throat region 52. In accordance with this invention, the profile formed by the mixer section wall between each mouth region 50 and the associated throat region 52 is of exponential curvature such that each horn shaped lobe 36 is effectively a convex exponential acoustic impedance matching section. Such an exponential matching section exhibits a low acoustic impedance at the mouth region (e.g. mouth 50) and a high acoustic impedance at the throat region (e.g. throat 52). In the practice of this invention, the exponential contour of each horn shaped lobe 36 is shaped such that, relative to the frequency range which includes the core noise frequencies, the acoustic impedance at the throat regions 52 is substantially equal to the characteristic impedance of the sound absorbent material 46 and the acoustic impedance at the mouth region 50 is substantially equal to the characteristic impedance of the flowing turbine exhaust stream. Preferably, in most embodiments of the invention, the exponential contour of lobe 36 is of the hyperbolic cosine variety. The use of a lobe contour definable by the hyperbolic cosine function is advantageous in that it produces a desired impedance match with a minimum horn length. Such a hyperbolic contour can be described by the equation $y = \pm A \cosh(x/L) + C$ where $y$ is the dimension between the lobe wall surface and a radial axis equally spaced between the lobe wall surfaces (e.g. radial axis 54 of FIG. 2); A and C are constants which determine the dimensions of the mouth region 50 and the throat region 52; $x$ is the distance along the radial axis 54 of FIG. 2 as measured from the plane of the throat region 52; and L is the geometric length of the horn, i.e. L is the dimension between throat 52 and mouth 50 as measured along radial axis 54.

In most instances, the exact characteristic impedance of the turbine exhaust stream and the characteristic impedance of the sound absorbing material will not be readily determinable since the flow of the turbine exhaust gases is a complex process and the characteristic impedance of the sound absorbent material is dependent on a number of factors such as the velocity of the impinging gas particles. Further, the structure adjacent to the mouth region 50 and the throat region 52 (e.g. outer duct housing 32 and engine plug 40) modify the impedance at the throat and mouth regions over the impedance that would be exhibited if the lobes 36 were not proximately located to other structure. Accordingly, in determining the appropriate dimensional parameters for any particular application, it has been found advantageous to first design the horn contour by utilizing conventional methods of analytical acoustics and then subsequently modify the resulting horn structure by experimental means to determine the final configuration. For example, in the design of one embodiment of this invention, a point source of acoustic energy at a frequency near the center frequency of the core noise spectrum (e.g. 500 Hz.) was considered to be centrally located within the mouth region of a lobe 36 and radiating radially outward into a free space environment toward the throat region. With this design criteria, the effective mouth impedance was estimated as a function of frequency and the horn contour parameters were selected to give a resistance of $\pi_0 c$ and zero reactance at 500 Hz. The performance of the mixer resulting from these analytical techniques was then experimentally determined and further experiments conducted to somewhat improve performance by slightly varying the mixer dimensions. Regardless of the design technique employed, it can be realized that in each embodiment of this invention the lobes 36 form exponential acoustic matching sections or horns which increase the transfer of core noise energy between the turbine exhaust duct 42 and the sound absorbent material 46.

In addition to increasing the energy coupled to the sound absorbent material 46, the horn shaped lobes 36 increase the suppression of core noise in yet another manner. As the core noise energy propagates radially outward through each horn shaped lobe 36, the local practice velocity of a gas molecule within the acoustic wave front is increased due to the impedance matching characteristics of the horn shaped lobe. Thus the energy propagates into the sound absorbing material 46 with relatively high particle velocities. Since most conventional sound absorbing materials, such as the previously mentioned Brunsacoustic and felt metal are nonlinear in that the acoustic impedance is higher at higher particle velocities, the dissipation of core noise energy within the sound suppressing material 46 is further enhanced. This dissipation mechanism should accordingly be considered in selecting a sound absorbent material for use as sound absorbent material 46. In this respect, it is believed that sound absorbent materials characterized by a nonlinearity factor (NLF) of between 1 and 3 are advantageously employed in embodiments of this invention. As is known in the art, the nonlinearity factor is a performance parameter associated with sound absorbent materials and is the ratio of the specific airflow resistance at a flow rate of 200 cm./sec. to the specific airflow resistance at 20 cm./sec.

As can be ascertained from the above description, optimum suppression of core noise is achievable by maximizing the outward radial propagation of the noise energy. Such outward radial propagation of the noise energy occurs within turbine exhaust duct 42 of mixer section 34 due to the divergence of mixer secition 34 relative to the direction of the turbine exhaust flow and is further inherently enhanced due to temperature gradients that are established along the radial direction. These radial temperature gradients occur because of the flow of the relatively cool fan air through the surrounding fan duct 44 and cause refraction of the core noise wave energy toward the walls of the mixer section 34 and hence toward the sound absorbent material 46. Additionally, in the practice of this invention, the geometry of the engine plug 40 and the geometry of the mixer lobes 36 increase the outward radial propagation. First, it is preferable to contour the engine plug 40 such that a portion of the noise energy traveling through the turbine exhaust duct 42 impinges on the surface of the engine plug and is reflected outwardly in the radial direction toward the sound absorbent material 46. Referring to FIG. 1, the portion of the engine plug 40 that is located within mixer section 34 of the depicted embodiment is of a generally increasing diameter relative to the direction of turbine exhaust gas flow. Thus a portion of the particles traveling near the surface of the plug 40 strike the plug surface and are reflected outwardly toward the inwardly opening mouth regions of the lobes 36. Secondly, the contour of the engine plug 40 and the axial contour of the lobes 36 establish velocity gradients within mixer section 34 relative to the transverse or radial direction. That is, as can be observed in FIG. 1, gas particles flowing rearwardly along or near the crest of the mixer lobes 36 travel a greater distance to reach the mixer section aft edge 38 than do particles near the walls of the engine plug 40. Accordingly, the axial component of velocity is less for particles near the crest of the lobes 36 than is the axial component of velocity for particles located closer to the engine plug 40. Thus as a particle travels radially outward due to the previously described radial component of velocity, the particle encounters the decreasing velocity gradients and is accordingly refracted toward the sound absorbing material 46.

Figure 3:
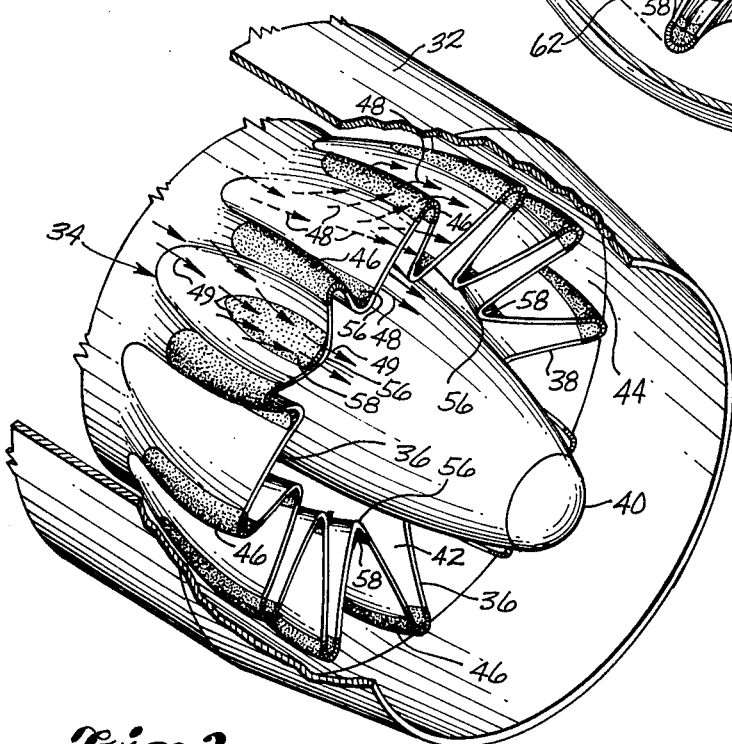
FIG. 3 is a partially cut-away perspective view of a mixer in accordance with this invention that illustrates the mixing of the primary and secondary flow streams and the suppression of both core and fan noise.

Referring to FIGS. 1 and 3, the structure and operation of this invention to suppress fan noise will now be discussed. As previously mentioned, the fan noise travels through the fan exhaust duct 44 and is generally comprised of acoustic energy having signal components within the 2-6 KHz portion of the frequency spectrum.

Due to the previously described axial geometry of the mixer section 34 and the mixer outer duct housing 32, the fan air and fan noise energy (denoted by the arrows 49) have both a rearwardly directed and radially inwardly directed component of velocity. Thus as the fan air and fan noise energy propagate rearwardly, a portion of the fan noise impinges on the outer surface of the mixer section 34. In the depicted embodiment of the invention, the valleys or interlobal regions 56 between adjacent mixer lobes 36 are provided with a sound absorbent liner 58 to dissipate at least a portion of the impinging fan noise energy. Sound absorbent liners 58 are constructed of a conventional lining material such as the previously mentioned Brunsacoustic or felt metal that is dimensioned and arranged to dissipate acoustic energy over the frequency range of 2-6 KHz. Each sound absorbent liner 58 extends axially along the interlobal region 56 formed by adjacent mixer lobes 36 and generally extends a short distance outwardly along each radially extending wall of the adjacent mixer lobes 36.

Referring now to FIG. 2, it can be observed that establishing the cross-sectional geometry of each lobe 36 such that the interior surface of each mixer lobe effectively forms a convex exponential acoustic matching section to efficiently transfer core energy to the sound absorbent material 46, results in an interlobal geometry having a cross-sectional shape that is effectively a concave exponential horn. That is, between any two adjoining lobes 36 that are dimensioned in cross section as previously described to define a convex exponential horn, the cross-sectional geometry of the outer surface of the mixer section is effectively the shape of the concave exponential horn. Each such concave exponential horn includes a mouth region 62 that opens outwardly toward the interior surface of the outer duct housing 32 and a throat region 64 formed by the valley or interlobal region 56 between the respective mixer lobes 36. Advantageously, since the fan noise occupies a relatively wide region of the frequency spectrum, the concave horns formed by shaping the lobes 36 to form convex horns for the maximum attenuation of core noise, substantially effect an impedance match between sound absorbing liners 58 and the fan noise energy flowing rearwardly through exhaust fan duct 44. Thus a significant portion of the fan noise energy is coupled to sound absorbent liners 58 with a resulting substantial reduction in the fan noise propagating from the gas turbine engine exhaust orifice.

It will be realized by those skilled in the art that the above-described embodiment of this invention is exemplary in nature and that many variations are possible without departing from the scope and spirit of this invention. For example, although a 12 lobe mixer section is depicted, the invention can be embodied with any number of lobes found to be practical. Further, although the engine plug 40 is depicted as having a generally circular cross section, other conventional plug configurations can be employed. For example, plugs having axially extending corrugations or flutes are often employed in gas turbine engines and are suitable for the practice of this invention. Additionally, although the invention has been disclosed as an internal mixer stage within a gas turbine engine of the turbofan variety wherein the turbine exhaust gases are mixed with air flowing from the engine fan stage, it will be recognized that this invention may be utilized in many other applications in which primary and secondary fluid streams are mixed and it is desirable or necessary to suppress acoustic energy propagating in one or both of the fluid streams.

What is claimed is:

1. In a gas turbine engine mixer including a plurality of axially extending circumferentially spaced lobes of increasing radial dimension relative to the longitudinal dimension of said mixer, wherein turbine exhaust gases flowing through the interior of said mixer are mixed with secondary gaseous flow passing along the exterior of said mixer to suppress jet noise, improved suppression means for at least partially dissipating the core noise energy contained within said turbine exhaust gases comprising:

first sound absorbing means for absorbing said core noise energy contained within said turbine exhaust gases, said first sound absorbing means axially mounted along the crest of each of said axially extending lobes, each of said axially extending lobes characterized in that the cross-sectional geometry of each lobe defines a convex exponential acoustic impedance matching horn, each of said convex acoustic impedance matching horns for matching the characteristic impedance of said first sound absorbing material to the characteristic impedance of the turbine exhaust flow containing said core noise energy, each of said convex exponential horns having a mouth region opening inwardly toward said flowing turbine exhaust gases and a throat region located radially outward of said mouth region, each of said convex exponential acoustic matching horns maximizing the outward radial transfer of core noise to said first sound absorbing material.

2. The improvement of claim 1, wherein said first sound absorbing means is operable over the frequency range of approximately 50-1,000 Hz.

3. The improvement of claim 1, wherein said first sound absorbing means is a gas permeable sheet material, said gas permeable sheet material defining said crest of said lobes.

4. The improvement of claim 1, wherein said cross-sectional geometry of each of said axially extending lobes is further characterized in that said cross-sectional geometry is definable as a mathematical function of a hyperbolic cosine.

5. The improvement of claim 1, further comprising second sound absorbing means for dissipating at least a portion of the sound energy contained within said secondary gaseous flow, said second sound absorbing means axially mounted along each interlobal region defined by adjacent ones of said axially extending circumferential spaced lobes.

6. The improvement of claim 5, wherein said gas turbine engine is of the turbofan variety, said secondary gaseous flow being supplied by the fan stage of said turbofan engine, said second sound absorbing means being operable over the frequency range of approximately 2-6 KHz.

7. In a gas turbine engine having a rearwardly extending engine plug centrally located relative to the cross-sectional geometry of said gas turbine engine, a mixer assembly for mixing the turbine exhaust gases of said engine with a secondary gaseous flow of a lower temperature and velocity than that of said turbine exhaust gases, said mixer assembly comprising:

a generally tubular mixer section having a plurality of axially extending corrugations spaced about the cross-sectional periphery thereof, said corrugations of increasing radial dimension relative to the length of said mixer section, the cross-sectional area of each of said corrugations decreasing exponentially relative to the outward radial direction to impart a convex cross-sectional geometry to each of said corrugations, the outermost terminating portion of each of said corrugations being formed of a gas permeable sound absorbent material, said mixer section coaxially mounted about said engine plug for forming a generally annular flow duct between said engine plug and said mixer section for the flow of said turbine exhaust gases; and a generally circular exhaust duct, said exhaust duct coaxially mounted about said coaxially arranged mixer section and engine plug, said exhaust duct and said mixer section defining a generally annular flow duct for said secondary gaseous flow.

8. The mixer assembly of claim 7, wherein said gas permeable sound absorbing material exhibits sound suppression over a frequency range of approximately 50-1,000 Hz.

9. The mixer assembly of claim 7, wherein said mixer section further includes a plurality of sound absorbent liners, each of said sound absorbent liners being axially mounted along the region between adjoining ones of said axially extending corrugations.

10. The mixer assembly of claim 9, wherein said gas turbine engine is of the turbofan variety, said secondary gaseous flow being fan air supplied by the fan stage of said turbofan engine, said plurality of sound absorbing liners comprising sound absorbent material exhibiting sound suppression over the frequency range of approximately 2-6 KHz.

11. In a gas turbine engine mixer including a plurality of axially extending circumferentially spaced lobes of increasing radial dimension relative to the longitudinal dimension of said mixer, wherein turbine exhaust gases flowing through the interior of said mixer are mixed with a secondary gaseous flow passing along the exterior of said mixer to suppress jet noise, improved noise suppression means for at least partially dissipating the noise energy within said secondary gaseous flow comprising:

a plurality of sound absorbent liners, each of said sound absorbent liners being axially mounted along an interlobal region formed between adjacent ones of said axially extending lobes, said axially extending lobes being characterized in that the cross-sectional geometry of said adjoining lobes defines a concave exponential acoustic impedance matching horn for matching the characteristic impedance of said sound absorbent liners to the characteristic impedance of said second gaseous flow.

12. The improvement of claim 11 wherein said gas turbine engine is of the turbofan variety, said second gaseous flow being supplied by the fan stage of said turbofan engine, said sound absorbent liners dissipating acoustic energy over a frequency range of approximately 2-6 KHz.

* * * * *